Sept. 22, 1964 R. L. VAUGHN 3,149,535
MACHINING APPARATUS
Filed April 13, 1959 3 Sheets-Sheet 1

INVENTOR.
ROBERT L. VAUGHN
BY
George C. Sullivan
Agent

Sept. 22, 1964  R. L. VAUGHN  3,149,535
MACHINING APPARATUS
Filed April 13, 1959  3 Sheets-Sheet 2
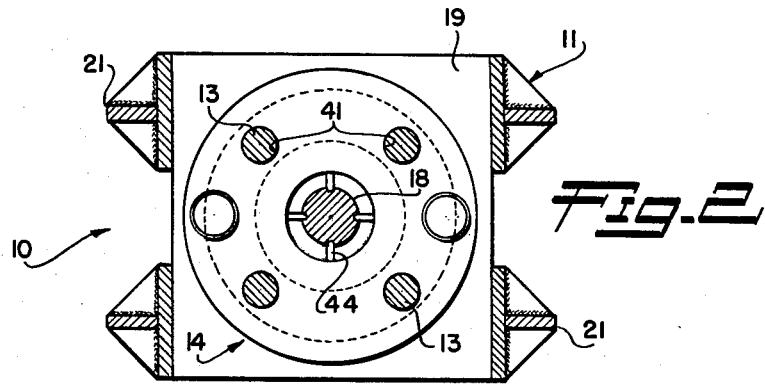
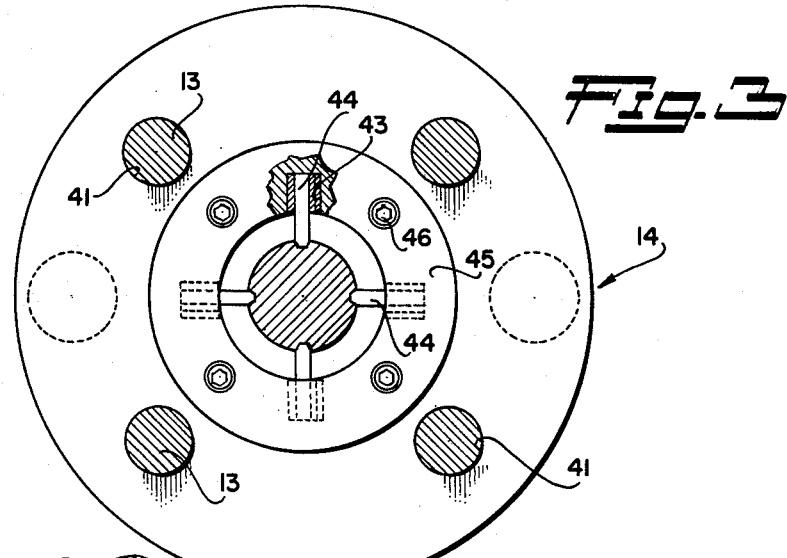
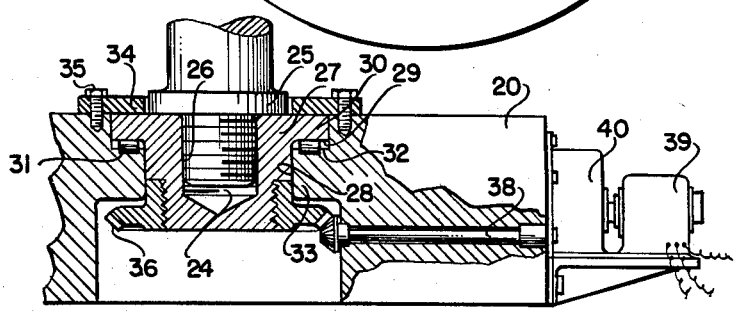
INVENTOR.
ROBERT L. VAUGHN
BY
Agent Sept. 22, 1964  R. L. VAUGHN  3,149,535
MACHINING APPARATUS
Filed April 13, 1959  3 Sheets-Sheet 3
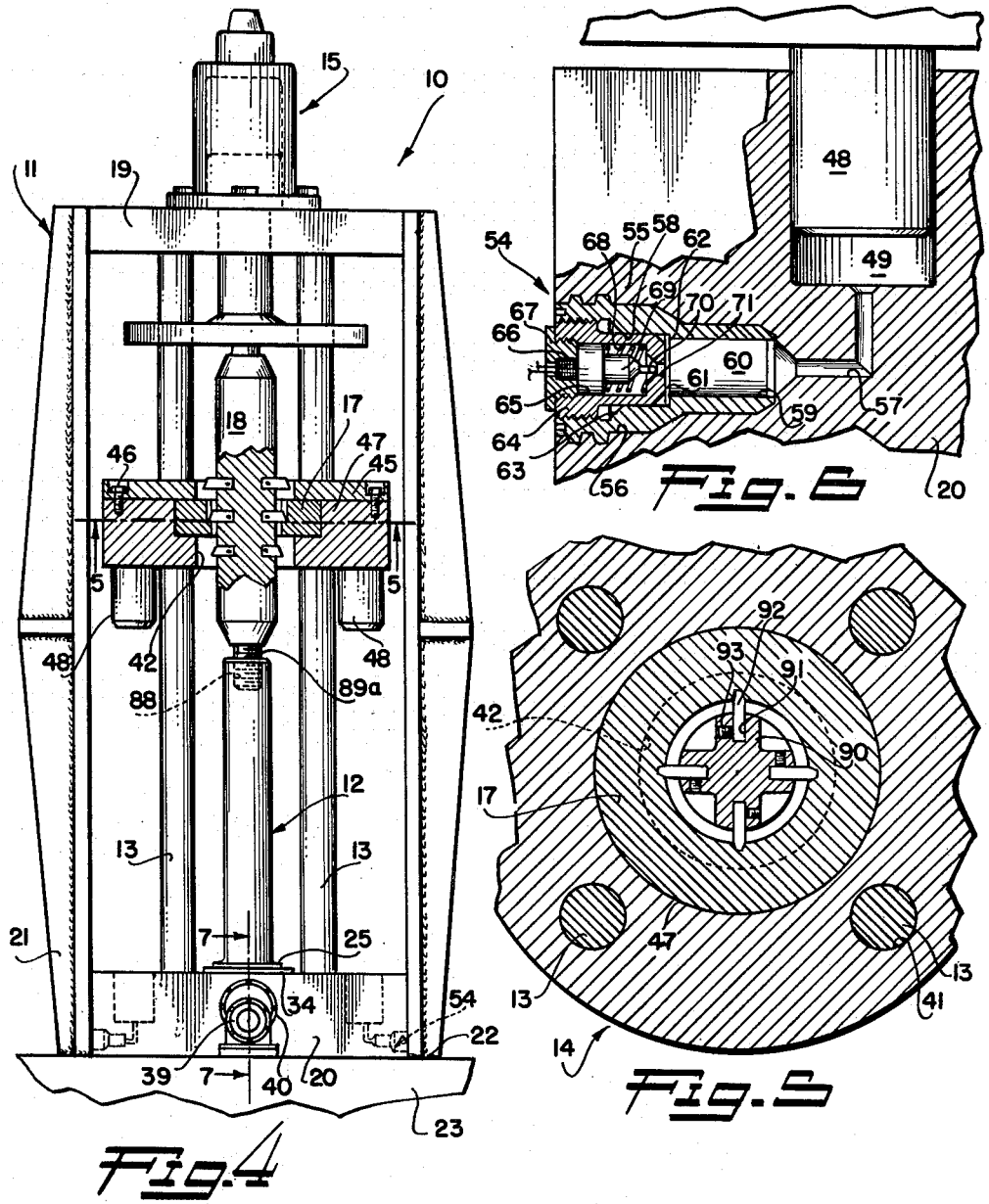
INVENTOR.
ROBERT L. VAUGHN
BY
George C. Sullivan
Agent United States Patent Office 3,149,535
Patented Sept. 22, 1964

3,149,535
MACHINING APPARATUS
Robert L. Vaughn, Granada Hills, Calif., assignor to Lockheed Aircraft Corporation, Burbank, Calif.
Filed Apr. 13, 1959, Ser. No. 805,900
8 Claims. (Cl. 90—24)

The present invention relates to a high speed cutting apparatus, and more specifically, to a machine tool which employs a ballistic missile for machining a work surface.

Because of certain advances in technology, previously acceptable metals for use in certain applications are no longer acceptable, and new materials with high strength-weight ratios at elevated temperatures have to be employed. A good example would be, for example, the aircraft industry wherein aluminum has been used for many years as the primary metal in the construction of aircraft. Because of the great increases in the speed of such aircraft, however, aluminum, which does not have a great strength-weight ratio at high temperatures, is no longer suitable, and new materials, such as various types of steel alloys and titanium alloys, are being used to meet the necessary structural requirements.

Aluminum alloy is an easy material to machine and cutter speeds up to 15,000 surface ft. per minutes are practical. At these speeds, a large quantity of aluminum can be removed in a very short period of time with present equipment. Cutting speeds for steel and titanium alloys utilizing present equipment are only approximately 2% of the speed practical with aluminum alloys. As a result, and assuming that present methods of machining are not improved, it has been estimated that machining the required quantities of such high strength thermal resistent alloys by conventional methods will require at least four to ten times the number of machines, the amount of floor space, and the man hours now required for machining a like quantity of aluminum allow in the same time period. This is attributable to the fact, and as previously suggested, that as opposed to cutting speeds of 15,000 surface ft. per minute for machining aluminum alloy, hardenable ferrous and titanium alloys are today being machined at cutting speeds of on or about 350 surface ft. per minute in the annealed condition and less than 100 surface ft. per minute in the hardened condition. Any attempt to increase this cutting speed with conventional machines and cutters results only in damaged tools and cutters and a high scrap loss. It will be appreciated that the relatively slow cutting speed on these hardened alloys is necessary to compensate for the very high tool pressures and temperatures which are generated during the cutting process.

While high speed cutting is not possible on these hardened metals using conventional methods, it has been discovered that ultra high speeds, for example, speeds in the range of from 30,000 to 160,000 or more surface ft. per minute, are practical without deformation of the work piece. It has also been found that a decrease in tool pressure accompanies ultra high cutting speeds, and because of this reduction in tool pressures, materials can be machined in the fully heat treated condition, finishes of machined surfaces are smoother and more uniform, and close tolerances are easier to maintain.

It is, therefore, a primary object of the present invention to generally improve the art of metal cutting tools.

A further object of the present invention is to provide a machine tool for performing metal cutting operations on high strength material at ultra high speeds.

A still further object of the present invention is to provide a tool for performing machining operations on high strength material at ballistic speeds which employs a combination projectile and tool holder which is trained to move in a pre-determnied path relative to a work piece.

Yet another object of the present invention is to provide a tool for performing a machining operation on high strength material which employs means for training a work piece to be moved in a pre-determined path at ballistic speeds relative to a cutting tool.

Another object of the present invention is to provide a machine having an explosively actuated tool for performing metal cutting operations.

Other objects and advantages of the present invention will be readily apparent to those skilled in the art upon perusal of the following description and accompanying drawings wherein:

FIG. 2 is a cross-sectional view taken on the line 2—2 of FIG. 1.

FIG. 3 is a cross-sectional view taken on the line 3—3 of FIG. 1, slightly enlarged.

FIG. 4 is a view similar to FIG. 1 showing a different embodiment of the present invention.

FIG. 5 is a cross-sectional view taken on the line 5—5 of FIG. 4, slightly enlarged and with parts broken away.

FIG. 6 is a side elevational view of certain structure of FIG. 4, slightly enlarged and with parts broken away to show details in construction.

FIG. 7 is a vertical sectional view taken on the line 7—7 of FIG. 4, slightly enlarged and with parts removed.

Figure 1:
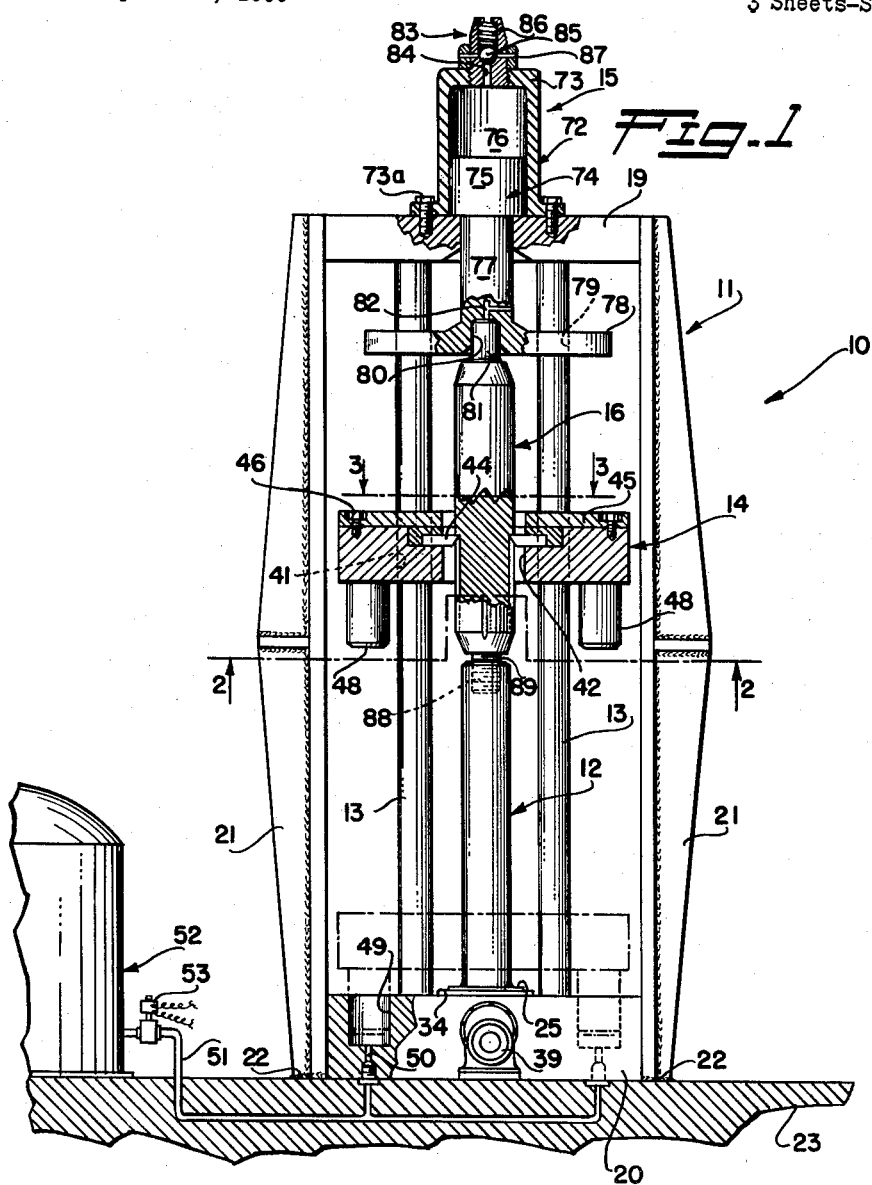
FIG. 1 is a side elevational view of a machine tool embodying the principles of the present invention, with parts removed and with parts cut away to show details in construction.

Referring now to the drawings, and particularly to FIGS. 1 and 4 thereof, the principles of the present invention are disclosed as being embodied in a machine tool for performing metal cutting operations designated generally by the number 10 and which broadly comprises a support structure 11, a support mandrel 12, a plurality of guide rails 13, a projectile 14 trained to move in a pre-determined guided path by said guide rails 13, and a damping mechanism 15 in the path of travel of the projectile 14. In the embodiment of the invention disclosed in FIG. 1, a work piece 16 is located between the damping mechanism 15 and the support mandrel 12 and the projectile 14 is a combination projectile and tool holder; whereas, in the embodiment of the invention disclosed in FIG. 4, a work piece 17 is carried by projectile 14 so as to be a combination projectile and work piece holder and a tool holder 18 is located between the damping mechanism 15 and support mandrel 12.

The support structure 11 is fabricated of suitable sheet metal and comprises a top member 19, a bottom member 20, and suitable interconnecting upstanding members 21 which are welded at their respective ends 22 to the top and bottom members so as to form a rigid structure. The support structure 11 is carried or supported upon a suitable base or floor 23.

The support mandrel 12 is preferably formed of cylindrical stock material and carried in upstanding position by the bottom member 20. More specifically, the mandrel 12 has a lower threaded portion 24, see FIG. 7, which depends downwardly from a stop flange 25. The threaded portion 24 is threadedly received in an opening 26 formed in a suitable hub 27. Bottom member 20 has an opening 28 formed therein which is so shaped as to receive the hub 27, and a bottom surface 29 of an upper flange 30 of the hub is rotatably supported on a plurality of rollers 31 which are carried on the upper surface 32 of an inner flange 33. A retainer ring 34 encircles the flange 35 of the mandrel 12 and holds the flange 30 of the hub 27 in roller contact with the rollers 31, the retainer ring 34 being locked in this position by a plurality of screws 35. The bottom end of the hub 27 threadedly receives a gear 36 which is drivingly engaged with a spur gear 37 fixed to the end of a drive shaft 38. The drive shaft 38 is driven by an electric motor 39 through a speed reduction transmission, not visible, enclosed in a housing 40. It will be appreciated that this mechanism is suitable for indexing or rotating the mandrel 12 and consequently, the work piece 16 in the embodiment disclosed in FIG. 1 or the tool holder 18 in the embodiment disclosed in FIG. 4, as will be more fully appreciated hereinafter.

The projectile 14 is slideably received by the guide rails 13 so as to be trained to move in a pre-determined path. The guide rails 13 are preferably formed of tubular stock material and rigidly positioned between the upper member 19 and the bottom member 20 in equidistant relationship around the axis of the mandrel 12 and parallel therewith. In the present embodiment, four equally spaced and equidistant guide rails 13 are disclosed although it will be appreciated that the number of such guide rails actually employed forms no part of the present invention. The number employed, however, has to be sufficient so as to train the projectile to move freely without binding in its pre-determined path.

The projectile 14 in the present instance is preferably cylindrical in shape and formed of suitable metal stock material. Spaced openings 41 are formed therein for receiving the respective guide rails 13 so that the projectile 14 is slideable up and down on the guide rails as previously suggested. An axial opening 42 is formed in the projectile 14 so as to accommodate the work piece 16 or the work piece 18, as the case may be, and the mandrel 12. When the projectile functions as a combination projectile and tool holder, a plurality of radially extending grooves 43, see FIG. 3, are provided for receiving a plurality of cutting tools 44 and such cutting tools are locked in position by a retainer ring 45 fixed to the projectile by screws 46. When the projectile functions as a combination projectile and work piece holder, a cylindrical groove 47, see also FIG. 5, is provided for accommodating the work piece 17 and the work piece 17 is locked in position by the retainer ring 45 and screws 46.

As previously suggested, it is a function of this tool to perform machining operations on the work piece 16 or 17, as the case may be, at ultra high or ballistic cutting speeds. For propelling the projectile 14 at such high speeds, whether such projectile is functioning as a combination projectile and tool holder or combination projectile and work piece holder, it is provided with a plurality of downwardly depending pistons 48 which are received in suitable propellent chambers 49 formed in the bottom member 20. In the embodiment disclosed in FIG. 1, each of the chambers 49 is connected by a suitable duct 50 with a conduit 51 which extends from a power source 52. The conduit 51 adjacent the power source 52 has a suitable solenoid controlled valve 53 for triggering the projectile 12 upwardly. The power source 52 can be any suitable source of power which, when released by the valve 53 and directed into each of the chambers 49, will propel or drive the projectile 14 upwardly and consequently the cutting tools 44 through the work piece 16 at speeds approaching ballistic speeds. An example of such power source could be air, or any other gas, compressed to the extent that when it is released by the valve 53, it will expand in each of the chambers 49 at a rate sufficient to propel the projectile 14 upwardly on the guide rails 13 with the desired force and speed.

The projectile 14 can also be explosively actuated so as to move in its cutting direction at ballistic speeds. An example of such embodiment is disclosed in FIGS. 4 and 6 wherein a cartridge firing mechanism 54 is associated with each of the chambers 49. More specifically, each such cartridge firing mechanism comprises a firing barrel 55 threadedly received in an opening 56 formed in the bottom member 20. The opening 56 is interconnected by a duct 57 with its associated chamber 49. The barrel 55 has an axial opening 58 formed therein which includes an inner cartridge receiving portion 59 shaped to receive a cartridge 60, the rim 61 of the cartridge seating upon a shoulder 62, and a breech receiving portion 63 which is shaped to threadedly receive a breech 64. The breech 64 in turn has an axial opening 65 formed therein which is shaped to receive a solenoid 66 and a plug 67 is threadedly received on the outer end of the breech so as to seal that end of the breech and retain the solenoid against movement in one direction. The solenoid is maintained against the plug and against movement in the other direction by means of a compression spring 68. The solenoid can be of any suitable and well-known construction and employs a core 69 which has a firing pin 70, the firing pin 70 being in alignment with a restricted opening 71 formed on the inner end of the breech and in alignment with the firing cap of the cartridge. When the solenoid is actuated, the firing pin strikes the firing cap of the cartridge and the cartridge explodes, the readily expanding products of combustion being directed by the duct 57 into the associated chamber 49 against the associated piston 48 of the projectile. After firing, it is necessary to remove the breech 64 and insert a new cartridge and then to replace the breech before the projectile 14 can once again be moved in its cutting direction.

The damping mechanism 15 is provided for absorbing the impact of the projectile 14 at the conclusion of the cutting operation. This mechanism comprises a pneumatic cylinder 72, which includes a closed head housing 73 which is fixed to member 19 by screws 73a and in which is slideable a piston 74. The piston 74 consists of the piston head 75 slideable in a piston chamber 76 of the housing 73 and a piston rod 77 which carries adjacent its end a guided damper pad 78. The pad 78 has suitable opening 79 formed therein for receiving the guide rails 13 and is consequently trained to move in the same guided path as the projectile 14. An axial opening 80 is formed in the center of the pad 78 and receives a centering stub shaft 81 of the work piece 16 or the tool holder 18, as the case may be. The opening 80 is interconnected with the atmosphere by a port 82 so that the air in the opening 80 can be displaced when the stub shaft 81 is located therein.

The closed end of the housing 73 threadedly receives an air release valve 83. The valve 83 has an exhaust duct 84 against which is seated a ball 85. The ball 85 is urged to move into seating relationship with the exhaust duct 84 by the force of a compression spring 86, and when the air in the headspace of the piston chamber 76 is urged against the ball 85 with a force greater than that exerted by the spring 86, the ball 85 will move in an unseating direction a distance sufficient to move the exhaust duct 84 into communication with outlet ducts 87 which are connected with the atmosphere.

In operation, when the projectile 14 is moved in its cutting direction at ballistical speeds, it comes in contact with the pad 78 after conclusion of the cutting operation. After the initial contact of the projectile with the pad 78, the force exerted by the projectile 14 against the pad 78 is sufficient to urge the piston 74 upwardly in the piston chamber 76 and compress the headspace of air in the piston chamber 76 to an extent sufficient to move the ball 85 against the spring 86, the air in the headspace being released to the atmosphere through the discharge port 84 and the radial port 87. The discharge port 84 and the radial port 87 are so calculated in size that the air in the headspace cannot be discharge into the atmosphere to permit the piston 74 to travel at the same rate of speed as the projectile. The force of the projectile is consequently absorbed by the cushion of air in the headspace against which the piston is forced and the impact of the projectile against the pad is substantially absorbed by the time the piston head 75 reaches the top of the chamber 76. The piston head 75 is so constructed that normal leakage between its circumferential surface and the inner wall of the chamber 76 permits air to refill the headspace as the piston 74 once again resumes its at-rest position as shown in FIG. 1 with the stub shaft 81 once again centered in opening 80.

Referring now specifically to the operation of the machine tool disclosed in FIG. 1, it will be appreciated that this arrangement is effective for making cuts upon the surface of the work piece 16. The support mandrel 12 has a threaded axial opening 88 formed in the upper end which receives a stub shaft 89 of the work piece so that the work piece is fixed to the support mandrel in co-axial relationship. Through the proper selection and arrangement of cutting tools 44 in the projectile, circumferential cuts can be made upon the surface of the work piece 16 of almost any desired configuration. For example, with the tool arrangement disclosed in FIG. 3, lineal cuts can be made upon the circumferential surface of the work piece 16 as indicated in FIG. 1. It will also be appreciated that after the initial pass of the projectile 14, that the work piece can be indexed so that configurations such as splines can be formed upon the surface of the work piece after a predetermined number of passes by the projectile 14. It will also be appreciated that the work piece can be given a pre-determined rotational movement upon the pass of the projectile so that spiral configurations can be cut.

Referring now specifically to the operation of the machine tool disclosed in FIG. 4, it will be appreciated that this arrangement is useful for cutting internal openings or holes formed in a work piece of almost any configuration or shape. The tool holder 18 likewise has a threaded stub shaft 89a which is threadedly received in the opening 88 of the support mandrel so as to be fixed thereto in substantially co-axial relationship. In the present instance, the tool holder 18, which is in the form of a broach, is shown as being square in cross-section, each leg 90 having a plurality of openings 91 formed therein for receiving a cutting tool 92, each of the cutting tools being retained in its cutting position by means of a suitable set screw 93. With this arrangement, it will be appreciated that any number of cutting tools can be mounted on the tool holder 18 and that almost any shape or configuration can be formed on the work piece 16 through a single or consecutive passes, after indexing, of the projectile.

The broad principles of the present invention entail means for propelling either a work piece or a cutting tool at ultra high speeds in a pre-determined path and means for locating either a cutting tool or a work piece so that it extends into the path of travel a pre-determined distance and machining operations are performed on the work piece. As previously suggested, it has been discovered that ultra high cutting speeds, for example, speeds in the range of from 30,000 to 160,000 or more surface ft. per minute, are not only practical, but result in reduction in tool pressures so that the work piece can be machined in fully heat treated condition, and the finishes of the machined surfaces are smoother and more uniform and close tolerances are easier to maintain. It is understood, of course, that in the embodiment of the principles of this invention disclosed herein the projectile, after being propelled in its cutting direction, moves back into its starting position by gravity.

What is claimed is:

1. A machine tool for performing metal cutting functions upon a workpiece comprising, a projectile, means for causing said projectile ot move in a predetermined lineal path, a support mandrel substantially parallel with said path of movement of said projectile for rigidly holding said workpiece relative to said projectile, a cutting tool fixed to said projectile and in cutting relationship to the surface of said workpiece upon movement of said projectile in one direction in said path, said projectile encircling said workpiece and said cutting tool extending radially from said projectile, and means for propelling said projectile, to move in said one direction.

2. A machine tool for performing metal cutting operations at ultra high cutting speeds with a cutting tool element upon a work piece element, comprising: a support frame having spaced upper and lower members; a plurality of guide means in parallel and secured to said support frame between said upper and lower members; a support mandrel having one end secured to one of said members, having its other end located a discrete distance away from said one member toward the other of said members, and being parallel to said guide means; a projectile in slidable engagement with said guide means and caused to be guided in a lineal path between said upper and lower members by said guide means, said projectile having an axial opening freely passable about said support mandrel; means for securing one of said elements to said projectile within said axial opening whereby a work portion of such element is directed radially inward and is freely passable about said support mandrel; means for securing the other of said elements to said other end of said support mandrel whereby a work portion of such element is directed radially outward a distance sufficient to cause cutting interference with said one element during projectile movement relative therebetween; and means for propelling said projectile from initial abutment against one of said members completely past such other of said elements, said projectile having a predetermined mass and such propulsion being with a predetermined initial force such that said projectile maintains an ultra high speed during the entire cutting operation.

3. The tool defined in claim 2 wherein said projectile is substantially symmetrical about its axial opening, and said propelling means applies such propulsion force to said projectile at a plurality of spaced locations symmetrically disposed with respect to said axial opening.

4. A machine tool for performing metal cutting operations at ultra high cutting speeds with a cutting tool element upon a work piece element, comprising: a support frame having spaced upper and lower members; a plurality of guide means in parallel and secured to said support frame between said upper and lower members; a support mandrel having one end secured to one of said members, having its other end located a discrete distance away from said one member toward the other of said members, and being parallel to said guide means; a projectile in slidable engagement with said guide means and caused to be guided in a lineal path between said upper and lower members by said guide means, said projectile having an axial opening freely passable about said support mandrel; means for securing said cutting tool element to said projectile within said axial opening whereby a cutting portion of such element is directed radially inward and is freely passable about said support mandrel; means for securing said work piece element to said other end of said support mandrel whereby a work portion of such element is directed radially outward a distance sufficient to cause cutting interference with said cutting tool element during projectile movement relative therebetween; and means for propelling said projectile from initial abutment against one of said members completely past said work piece element, said projectile having a predetermined mass and such propulsion being with a predetermined initial force such that said projectile maintains an ultra high speed during the entire cutting operation.

5. The tool defined in claim 4 wherein said projectile is substantially symmetrical about its axial opening, and said propelling means applies such propulsion force to said projectile at a plurality of spaced locations symmetrically disposed with respect to said axial opening.

6. A machine tool for performing metal cutting operations at ultra high cutting speeds with a cutting tool element upon a work piece element, comprising: a support frame having spaced upper and lower members; a plurality of guide means in parallel and secured to said support frame between said upper and lower members; a support mandrel having one end secured to one of said members, having its other end located a discrete distance away from said one member toward the other of said members, and being parallel to said guide means; a projectile in slidable engagement with said guide means and caused to be guided in a lineal path between said upper and lower members by said guide means, said projectile having an axial opening freely passable about said support mandrel; means for securing said work piece element to said projectile within said axial opening whereby a work portion of such element is directed radially inward and is freely passable about said support mandrel; means for securing said cutting tool element to said other end of said support mandrel whereby a cutting portion of such element is directed radially outward a distance sufficient to cause cutting interference with said work piece element during projectile movement relative therebetween; and means for propelling said projectile from initial abutment against one of said members completely past said cutting tool element, said projectile having a predetermined mass and such propulsion being with a predetermined initial force such that said projectile maintains an ultra high speed during the entire cutting operation.

7. The tool defined in claim 6 wherein said projectile is substantially symmetrical about its axial opening, and said propelling means applies such propulsion force to said projectile at a plurality of spaced locations symmetrically disposed with respect to said axial opening.

8. A machine tool for performing metal cutting operations at ultra high cutting speeds upon a work piece element, comprising, a support frame having spaced upper and lower members, a projectile caused to move in a linear path between said upper and lower members, a cutting tool element, means for fixing one of said elements with said projectile so as to move therewith, means for supporting the other of said elements in said support frame between said upper and lower members so that upon movement of said projectile in one direction in said path said cutting tool is in cutting relationship to said work piece, a damping cylinder carried by the upper member of said frame, said cylinder having a damper pad in the path of movement of said projectile for absorbing the impact of said projectile upon conclusion of the metal cutting operation, said projectile having a depending piston and said bottom member of said frame having a propelling chamber formed therein for snugly receiving said piston, and means for directing into said chamber a propellant force sufficient to drive said piston out of said chamber with a velocity sufficient to move said projectile in said one direction at ultra high speeds during the entire cutting operation, said other of said elements being fixed to a support mandrel upstanding from said bottom member of said frame, and means for rotating said support mandrel to move in predetermined increments for cutting predetermined configurations upon the work piece.

References Cited in the file of this patent

UNITED STATES PATENTS

| 262,375 | Cosgrove | Aug. 8, 1882 |
| 2,302,646 | Temple | Nov. 17, 1942 |
| 2,315,476 | Groene | Mar. 30, 1943 |
| 3,530,066 | Laase | Nov. 14, 1950 |
| 2,545,435 | Langel | Mar. 20, 1951 |
| 2,581,645 | Frieder et al. | Jan. 8, 1952 |
| 2,872,682 | Maier | Feb. 10, 1959 |
| 2,926,565 | Thorness | Mar. 1, 1960 |
| 3,024,531 | Haskell | Mar. 13, 1962 |

FOREIGN PATENTS

| 169,919 | Switzerland | June 15, 1934 |